United States Patent [19]

Fowler et al.

[11] Patent Number: 4,991,443

[45] Date of Patent: Feb. 12, 1991

[54] VIBRATION TESTING SYSTEM

[75] Inventors: David L. Fowler; Dennis P. Gregory, both of Tucson, Ariz.

[73] Assignee: Hughes Aircraft Company, Los Angeles, Calif.

[21] Appl. No.: 428,142

[22] Filed: Oct. 27, 1989

[51] Int. Cl.$^5$ ............................................. G01M 7/00
[52] U.S. Cl. ...................................... 73/663; 73/662
[58] Field of Search ................. 73/662, 663, 665, 667, 73/668, 666; 248/362, 363

[56] References Cited

U.S. PATENT DOCUMENTS

| | | | |
|---|---|---|---|
| 3,699,807 | 10/1972 | Kerley, Jr. et al. | 73/665 |
| 4,718,629 | 1/1988 | Block et al. | 248/363 |
| 4,776,217 | 10/1988 | Nolan | 73/663 |
| 4,848,160 | 7/1989 | Marshall et al. | 73/663 |

*Primary Examiner*—Hezron E. Williams
*Assistant Examiner*—Rose M. Finley
*Attorney, Agent, or Firm*—C. D. Brown; R. M. Heald; W. K. Denson-Low

[57] ABSTRACT

A rapid exchange vacuum fixture vibration system adapted for use with a vibration testing machine designed to move a surface to induce vibration in a fixture attached to a unit under test, includes an adapter plate attached, at a first surface, to the surface of the vibration testing machine. A vacuum panel assembly, housing a vacuum pump, is included for creating a vacuum between the upper surface of the adapter plate and the lower surface on the fixture whereby the fixture and the unit under test attached thereto is secured to the adapter plate and thereby secured to the vibration testing machine without using bolts or other hardware for clamping. A method of the invention includes the steps of attaching an adapter plate to the vibration machine; easily placing a fixture, with a unit under test attached, on the adapter plate; and evacuating the volume between the adapter plate and the fixture to create a holding force therebetween sufficient to hold the fixture to the adapter plate during vibration testing.

10 Claims, 3 Drawing Sheets

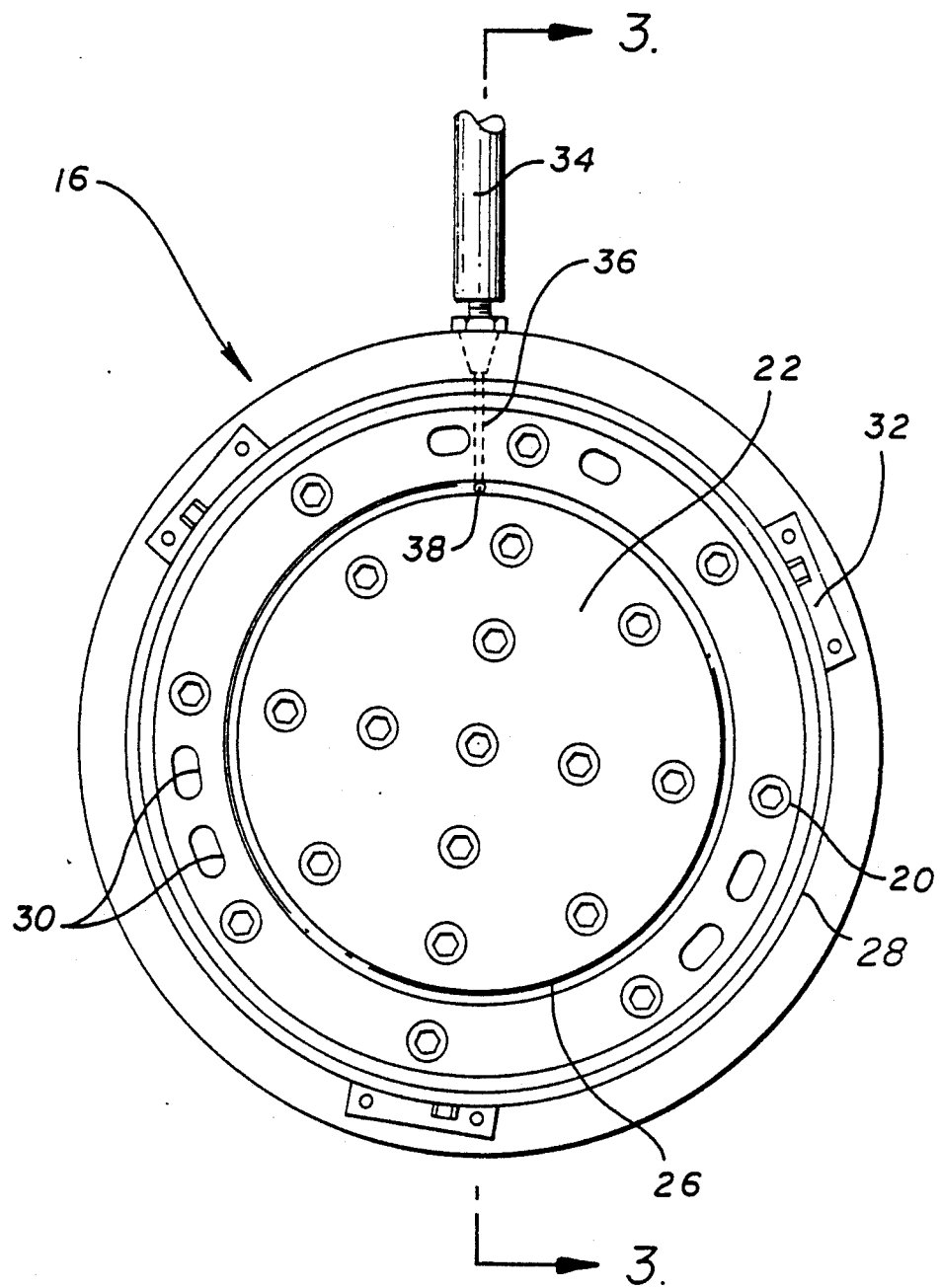

VIBRATION TESTING SYSTEM

BACKGROUND OF THE INVENTION

1. Field of the Invention

The present invention relates to test apparatus. More specifically, the present invention relates to vibration testing apparatus.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

2. Description of the Related Art

For particularly demanding or critical applications, it is often desirable to test certain components, devices, systems and the like, in a manner that simulates a highly stressful environment in which the device is designed to operate. For example, a vibration test is required for many missile components as part of the production and assembly routine. Typically, the device under test is attached to a fixture which is securely bolted into position on a vibrating machine and properly torqued. Vibration testing of another device required unbolting of the first fixture and bolting of the next. Each fixture may require as many as 21 half inch bolts. As the vibrating machines are somewhat expensive, it has heretofore been cost effective to test a large number of devices on a single machine. As a result, the vibration testing machine has been a bottleneck in a production line as the attachment and removal of each test fixture has been somewhat time consuming.

Thus, there is a need in the art for a vibration testing machine which provides for high speed attachment and removal of fixtures for vibration testing.

SUMMARY OF THE INVENTION

The need in the art is addressed by the present invention which is adapted for use with a vibration testing machine designed to move a surface to induce vibration in a fixture attached to a unit under test. The invention includes an adapter plate permanently attached, at a first surface, to the surface of the vibration testing machine. A vacuum panel assembly, housing a vacuum pump, is included for creating a vacuum between the upper surface of the adapter plate and a lower surface on the fixture whereby the fixture and the unit under test attached thereto is secured to the adapter plate and thereby secured to the vibration testing machine without using bolts or other hardware for clamping.

Thus, the method of the invention includes the steps of permanently attaching an adapter plate to the vibration machine; placing a fixture, with a unit under test attached, on the adapter plate; and evacuating the volume between the adapter plate and the fixture to create a holding force therebetween sufficient to hold the fixture to the adapter plate during vibration testing.

BRIEF DESCRIPTION OF THE DRAWINGS

FIG. 2 is a top view of the adapter plate of the present invention.

DESCRIPTION OF THE INVENTION

Illustrative embodiments and exemplary applications will now be described with reference to the accompanying drawings to disclose the advantageous teachings of the present invention.

Figure 1:
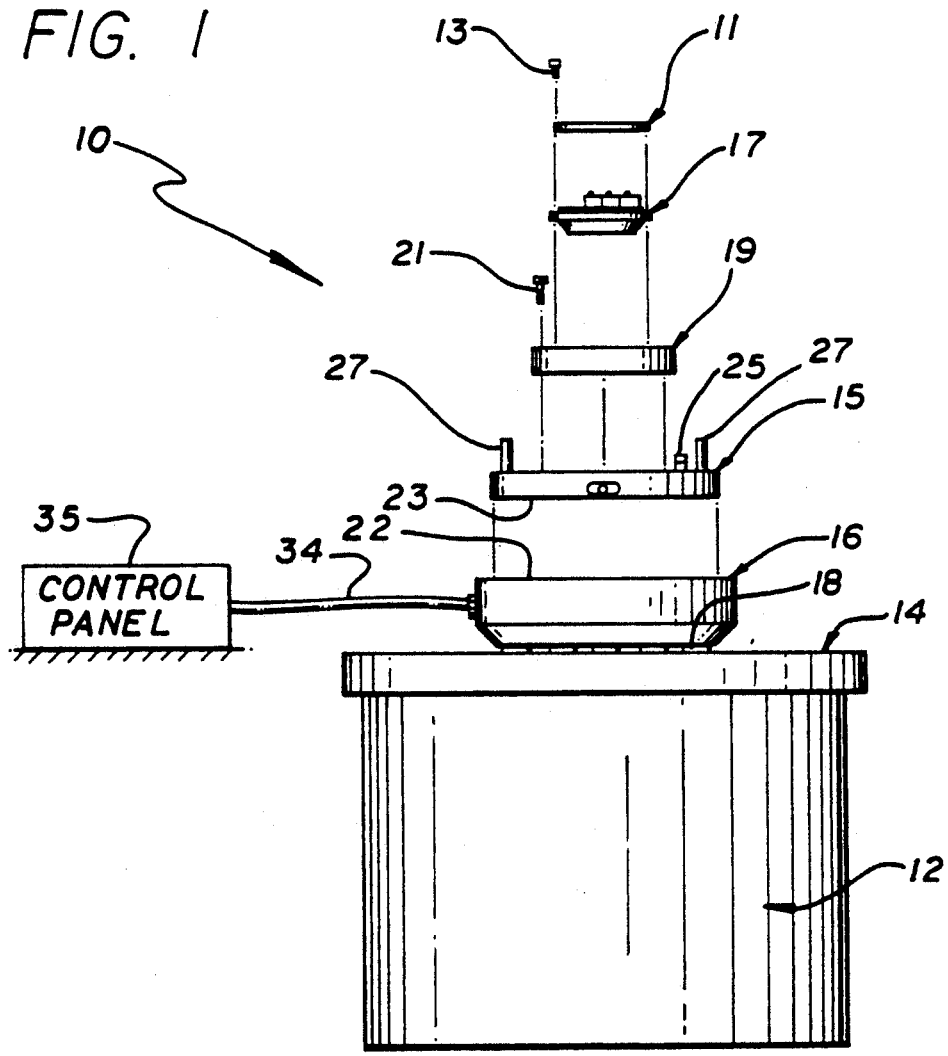
FIG. 1 is an illustrative representation of the improved vibration system of the present invention.
Figure 4:
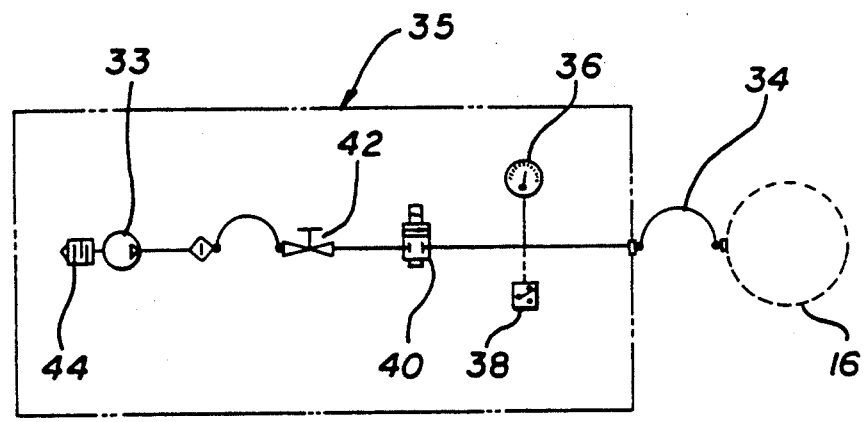
FIG. 4 is a schematic diagram of the vacuum system utilized in the system 10 of the present invention.

FIG. 1 is an illustrative representation of the improved vibration system 10 of the present invention. The system 10 includes an electrodynamic vibrator of conventional design and construction. The vibrator 12 has a surface 14 to which the adapter plate 16 of the present invention is secured. A unit under test (UUT) 17 is secured to an isolation fixture 19 by a washer ring 11 with screws 13. The isolation fixture 19 is, in turn, secured to a vacuum vibration fixture 15 with screws 21 or other suitable attachment mechanism. The isolation fixture 19 is provided between the evacuation fixture 15 and the UUT 17 to electrically isolate the static sensitive UUT. As is common in the art, the vacuum vibration fixture 15 includes an accelerometer 25 and handles 27.

As mentioned above, the prior technique of bolting and unbolting each fixture 15 directly onto the vibrator 12 was slow and added to the cost of testing each unit. The present invention provides a method and apparatus for rapidly attaching and detaching the fixture 15 to the vibrator 12. In accordance with the present teachings, the vacuum vibration fixture 15 is rapidly attached to the adapter plate 16 by creating a vacuum between the mating surfaces 22 and 23.

The adapter plate 16 may be constructed of anodized aluminum or other suitable material. As shown in FIG. 2 and in the sectional view of FIG. 3, the adapter plate 16 includes a plurality of bolts holes 20 which extend through the adapter plate 16. Bolts (not shown) secure the lower surface 18 of the adapter plate 16 to the vibrator 12. The upper (vacuum) surface 22 of the adapter plate 16 is flat to within 0.005 inch.

Figure 3:
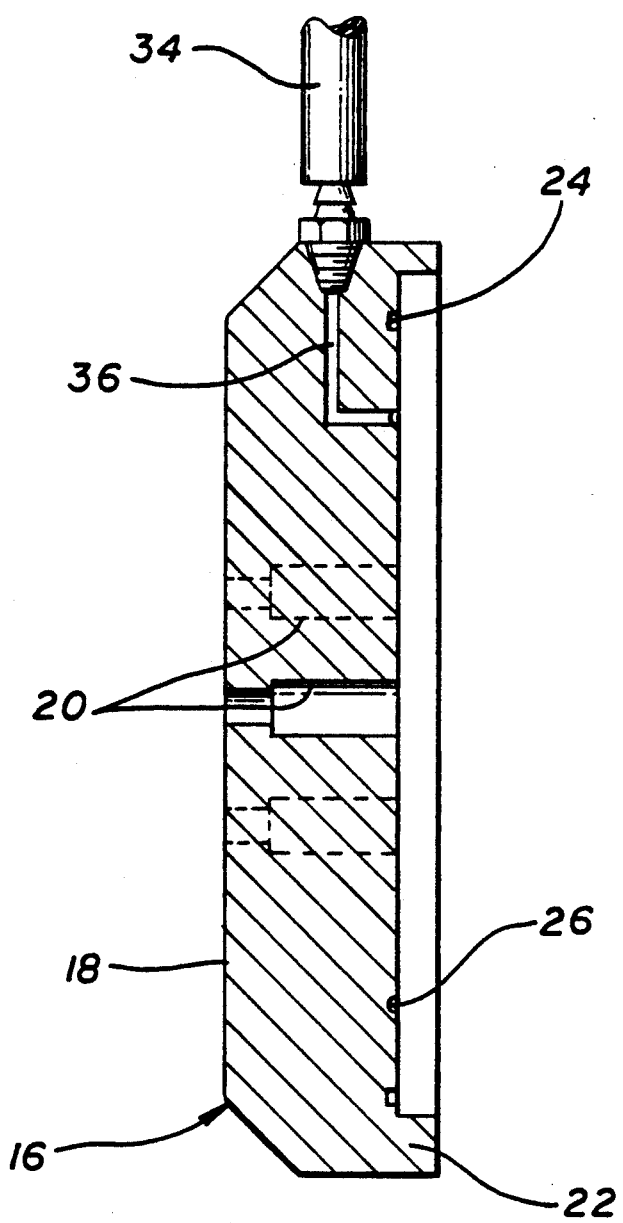
FIG. 3 is a sectional side view of the adapter plate shown in FIG. 2 taken along the line 3—3 thereof.

As illustrated in FIG. 3, the adapter 16 has first and second concentric grooves 24 and 26, respectively, in the vacuum surface 22. The inner groove 24 provides an evacuation ring to provide for the escape of air from the volume between the vacuum surface 22 of the adapter 16 and a vacuum surface 23 of the vacuum vibration fixture 15 during the evacuation process. The outer groove 26 provides a seat for an O-ring 28 which is coaxial with the adapter plate. See FIG. 2. In the preferred embodiment, the O-ring 28 is a 40 durometer, 0.210 diameter o-ring. The O-ring 28 provides a seal for the creation of vacuum holding force between the adapter plate 16 and the vacuum vibration fixture 15.

Air between the surface 22 of the adapter plate 16 and surface 23 of a fixture 15 is evacuated by a vacuum pump 33 (not shown) via a hose 34 and air passage 36 (shown in phantom) in the adapter plate 16. (The pump 33 is mounted within a control panel 35 of FIG. 1.) The air passage 36 allows for air flow from the surface 22 via a port 38 in the evacuation ring 24.

The adapter plate 16 also includes a plurality of fixture clearance holes 30 and a plurality of stainless steel index blocks 32 to insure proper indexing of the fixture 15.

FIG. 3 is a schematic diagram of the vacuum system utilized in the system 10 of the present invention. In the preferred embodiment, the vacuum system is mounted in the control panel 35 and includes a vacuum gage 36, a vacuum switch 38, a solenoid valve 40, a manual shut-off valve 42 and a mist eliminator 44 all in series with the vacuum pump 33.

As mentioned above, the elimination of air between the adapter plate 16 and the vacuum vibration fixture 15 allows atmospheric pressure to actually clamp the two surfaces together. The clamping force ratio $F_c$, vacuum holding force $F_h$ to mass dynamic force $F_d$, is calculated as follows. First, it is known that:

$$F_h = A \times (V_t - V_o) \qquad [1]$$

where A = the area inside the O-ring $28 = \pi D^2/4$, where D is the inside diameter of the O-ring 28; $V_T$ = the total vacuum available from the pump 33; and $V_o$ = the vacuum pressure needed to compress a 40 durometer o-ring.

$$F_d = M/gc \times Acc \times SF \qquad [2]$$

where M = Mass of the fixture 15 with the UUT and associated hardware; $g_c$ = the gravitational constant of 32.2 lbm ft/lbf sec.$^2$; Acc = acceleration in ft/sec.$^2$; and SF = safety factor (for maximum shaker output during random vibration—$3\sigma$).

Finally, $$F_c = F_h/F_d \qquad [3]$$

Thus, the present invention has bee described herein with reference to a particular embodiment for a particular application. All components are of conventional design and construction unless otherwise specified. Those having ordinary skill in the art and access to the present teachings will recognize additional modifications applications and embodiments within the scope of the present teachings.

It is therefore intended by the appended claims to cover any and all such applications, modifications and embodiments within the scope of the present invention.

Accordingly,

What is claimed is:

1. In a vibration testing machine having means for moving a surface of said vibration testing machine to induce vibration in a fixture attached to a unit under test, an improvement wherein said improvement comprises:

an adapter plate attached to said surface of said vibration testing machine at a first surface thereof; and pumping means for creating a vacuum between a second surface of said adapter plate and a surface on said fixture whereby said fixture and said unit under test attached thereto is secured to said adapter plate and thereby secured to said vibration testing machine.

2. The invention of claim 1 wherein said adapter plate includes an O-ring on the second surface thereof.

3. The invention of claim 2 wherein said O-ring is coaxial with said adapter plate.

4. The invention of claim 2 wherein said pumping means includes a vacuum pump.

5. The invention of claim 4 wherein said pumping means includes a hose connecting said pump to said adapter plate.

6. The invention of claim 5 wherein said adapter plate has an air passage extending from said second surface to said hose.

7. The invention of claim 6 including a shutoff valve connected in said hose between said pump and said adapter plate.

8. The invention of claim 7 wherein said shutoff valve is a solenoid shutoff valve.

9. A vibration testing machine comprising:

vibration means for moving a first surface of said vibration testing machine to induce vibration therein;

an adapter plate attached to said surface at a first surface of said adapter plate;

a fixture for attachment to a unit under test; and pumping means for creating a vacuum between a second surface of said adapter plate and a surface on said fixture whereby said fixture and any unit under test attached thereto is secured to said adapter plate and thereby secured to said vibration means.

10. A method for securing a unit under test to a vibration machine including the steps of:

(a) attaching an adapter plate to said vibration machine;

(b) placing a fixture on said adapter plate said fixture being attached to a unit under test; and (c) evacuating the volume between said adapter plate and said fixture to create a holding force therebetween sufficient to hold said fixture to said adapter plate.

* * * * *